United States Patent
Thorn et al.

(10) Patent No.: US 8,102,617 B2
(45) Date of Patent: *Jan. 24, 2012

(54) METHOD FOR TRANSPORTING A TAPE CARTRIDGE WITHIN A TAPE LIBRARY STORAGE SYSTEM UTILIZING A CURVED RACK SECTION AND INDEPENDENTLY ROTATABLE TEETH

(75) Inventors: Jeffrey L. Thorn, Tucson, AZ (US); Raymond Yardy, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 739 days.

This patent is subject to a terminal disclaimer.

(21) Appl. No.: 12/182,832

(22) Filed: Jul. 30, 2008

(65) Prior Publication Data

US 2008/0285172 A1 Nov. 20, 2008

Related U.S. Application Data

(63) Continuation of application No. 11/297,665, filed on Dec. 7, 2005, now Pat. No. 7,443,631.

(51) Int. Cl.
 *G11B 15/68* (2006.01)
(52) U.S. Cl. ...................................................... 360/92.1
(58) Field of Classification Search .................... 360/91, 360/92.1, 98.04, 98.06; 369/30.41, 30.43, 369/30.44
See application file for complete search history.

(56) References Cited

U.S. PATENT DOCUMENTS

| | | | |
|---|---|---|---|
| 3,633,433 A | 1/1972 | Schurch | |
| 6,930,855 B2 * | 8/2005 | Gupta et al. | 360/92.1 |
| 2001/0008473 A1 * | 7/2001 | Schmidtke et al. | 360/92 |
| 2003/0123184 A1 | 7/2003 | Ostwald et al. | |
| 2006/0268450 A1 * | 11/2006 | Nave et al. | 360/92 |

FOREIGN PATENT DOCUMENTS

JP   55 072940   6/1980

OTHER PUBLICATIONS

European Application No. 06830268.6-1232 Examination Report, Apr. 23, 2009.

* cited by examiner

*Primary Examiner* — Jefferson Evans
(74) *Attorney, Agent, or Firm* — Kunzler Needham Massey & Thorpe

(57) ABSTRACT

An apparatus for transporting a storage media cartridge in a data storage library is disclosed. The apparatus includes an accessor, a pinion and a rack having a straight section and a curved section. The curved section includes multiple rack teeth that are capable of rotating independently from each other to allow the pinion to travel along the straight section and onto the curved section of the rack, or vice versa, without any interruption.

4 Claims, 4 Drawing Sheets

METHOD FOR TRANSPORTING A TAPE CARTRIDGE WITHIN A TAPE LIBRARY STORAGE SYSTEM UTILIZING A CURVED RACK SECTION AND INDEPENDENTLY ROTATABLE TEETH

PRIORITY CLAIM

The present application is a continuation of U.S. patent application Ser. No. 11/297,665, filed on Dec. 7, 2005, entitled "Tape library storage system including an accessor transport system," and which has issued as U.S. Pat. No. 7,443,631, and which is incorporated herein by reference.

BACKGROUND OF THE INVENTION

1. Technical Field

The present invention relates to data storage libraries in general, and in particular to a data storage library having a robotic assembly operating on a guide rail. Still more particularly, the present invention relates to a tape library storage system having a robotic assembly operating on a guide rail with linear and curved sections.

2. Description of Related Art

An automated data storage library typically uses a mechanical robot to pick and place data storage cartridges into media drives and empty cartridge slots. The mechanical robot is often a self-supporting mechanism having a picker assembly at the end of an arm that can be moved in two or more directions. The robotic movement is commonly controlled by some type of actuator, and the number of actuators is often equal to, but not limited by the number of directions the mechanical robot moves. By using the electronic encoders on the actuators, the picker assembly can be positioned in proximity to the media drives or cartridge slots.

Some attempts have been made to alleviate the constraints of stand alone robotic arms by implementing carousel structures, draw cable devices, and track/rail type systems. These systems have some sort of guide rail (or track) and a carriage that moves the storage media cartridges to and from the media drives. The guide rail forms a path for directing the carriage to any desired position, be it in a continuous loop of a carousel, a straight line, or other combinations of straight and curved sections.

Guide rail and carriage system configurations generally use a rack and pinion arrangement that includes a pair of gears capable of converting rotational motion into linear motion. Typically, a circular pinion engages a linear rack located on a flat bar. Rotational motion applied to the circular pinion will cause the linear rack to move sideways up to the limit of its travel.

A guide rail and carriage guidance mechanism is desired to include both straight and curved sections in the guide rail. In order for a pinion to travel on a curved rack with the axis of the pinion perpendicular to the axis of curvature of the curved rack (when going around a curved section), the teeth on the curved rack must be aligned with the teeth of the pinion during rotation. As such, an intricate combination of pinion teeth/rack teeth must be designed in order to accomplish such purpose. For example, the rack teeth must be tapered in order to fit the curvature of the curved rack. Similarly, the mating pinion teeth must also be tapered in order to match the rack teeth such that proper meshing of the pinion teeth and the rack teeth can be achieved as the pinion travels on the curved rack. However, it is not possible for such pinion to continue on in a linear rack after the curve rack because regular straight pinion teeth are required.

The present disclosure provides an automated data storage library having an improved robotic assembly operating on a guide rail with linear and curved sections.

SUMMARY OF THE INVENTION

In accordance with a preferred embodiment of the present invention, an apparatus for transporting a storage media cartridge within a data storage library includes an accessor, a pinion and a rack having a straight section and a curved section. The curved section includes multiple rack teeth that are capable of rotating independently from each other to allow the pinion to travel along the straight section and onto the curved section of the rack, or vice versa, without any interruption.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
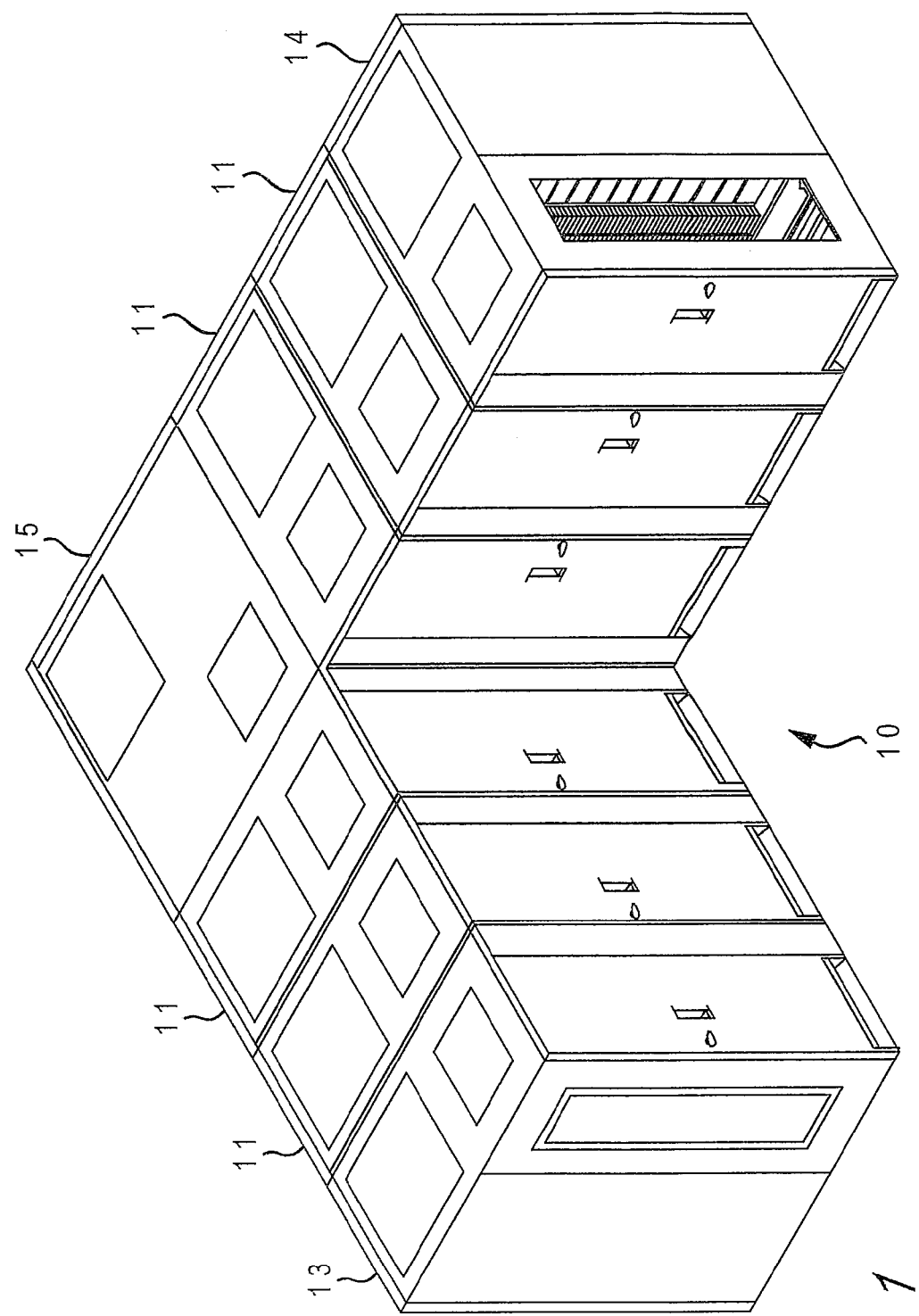
FIG. 1 is an isometric view of an automated data storage library in which a preferred embodiment of the present invention can be implemented.

Referring now to the drawings, and specifically to FIG. 1, there is depicted an isometric view of an automated data storage library in which a preferred embodiment of the present invention can be implemented. As shown, an automated data storage library 10 has a left-side service bay 13, a right-side service bay 14 and multiple storage frames 11, including a corner storage frame 15. A storage frame may be added to expand or removed to reduce the number of storage frames 11 and/or functionality of automated data storage library 10. One example of automated data storage library 10 is the IBM 3584 Ultra-Scalable Tape Library manufactured by International Business Machines Corporation of Armonk, N.Y.

Figure 2:
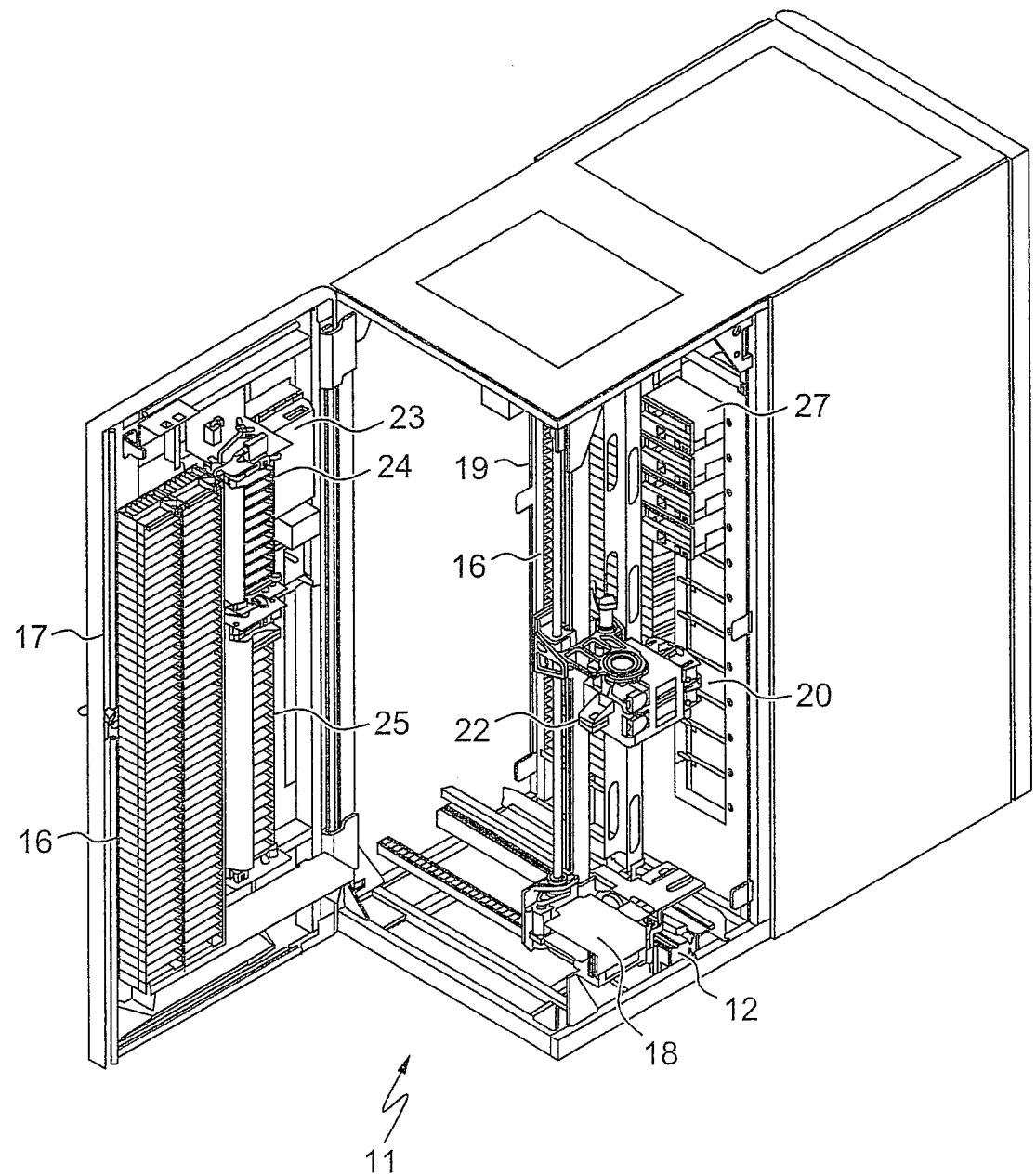
FIG. 2 is an isometric view of the configuration of the internal components of a storage frame within the automated data storage library from FIG. 1, in accordance with a preferred embodiment of the present invention.

With reference now to FIG. 2, there is illustrated an isometric view of the configuration of the internal components of a storage frame within automated data storage library 10, in accordance with a preferred embodiment of the present invention. As shown, storage frame 11 includes a front wall 17, a rear wall 19 and multiple storage cells 16 for storing data storage cartridges that contain data storage media. Storage frame 11 also includes multiple data drives 27 for reading data from and/or writing data to data storage media. An accessor (or robot) 18 is used to transport data storage media between storage cells 16 and data drives 27. Data drives 27 may be optical disk drives, magnetic tape drives, or any other types of drives that is capable of reading from and writing data to data storage media. Accessor 18 includes a gripper assembly 20 for gripping data storage media and may include a bar code scanner 22 mounted on gripper assembly 20 to "read" identifying information associated with the data storage media.

Storage frame 11 is arranged for accessing data storage media in response to commands from at least one external host computer system (not shown). Storage frame 11 may optionally include an operator panel 23 (or other user interface) that allows a user to interact with storage frame 11. Storage frame 11 may also optionally include an upper input/output (I/O) station 24 and/or a lower I/O station 25 for allowing data storage media to be inserted into storage frame 11 and/or removed from storage frame 11 without disrupting library operations.

Storage frame 11 may be configured with different components depending upon the intended function. The configuration of storage frame 11 shown in FIG. 2 has a linear rack 12. However, other storage frames, such as corner storage frame 15, may have a rack that includes a linear section and a curved section.

Figure 3:
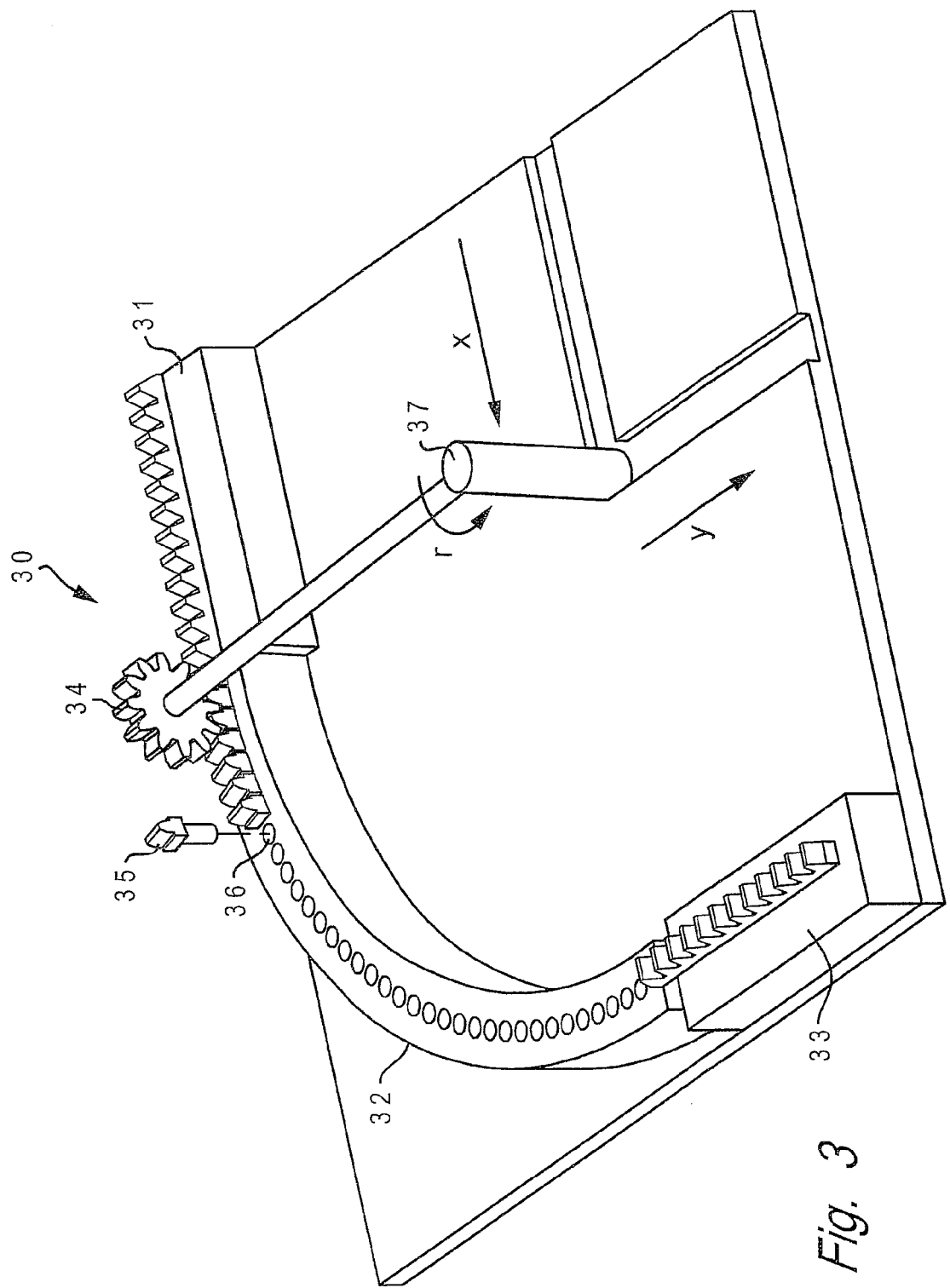
FIG. 3 is a perspective view of a rack and pinion assembly in a corner storage frame within the automated data storage library from FIG. 1, in accordance with a preferred embodiment of the present invention.

Referring now to FIG. 3, there is depicted a perspective view of a rack and pinion assembly within corner storage frame 15, in accordance with a preferred embodiment of the present invention. As shown, a rack and pinion assembly 30 includes a circular pinion 34 and a rack having a straight section 31, a curved section 32 and a straight section 33. In the present example, curved section 32 is located between straight section 31 and straight section 33.

Straight section 31 includes multiple rack teeth that are arranged in a straight line. Similarly, straight section 33 includes multiple rack teeth that are also aligned in a straight line. Rack teeth in each of straight sections 31 and 33 are permanently aligned to be parallel to each other. In contrast, each rack tooth in curved section 32 is allowed to rotate independently of other rack teeth in curved section 32 such that each rack tooth in curved section 32 can be aligned to conform with a curvature of curved section 32.

In order to allow independent rotation, each rack tooth in curved section 32 is preferably manufactured individually, on its own shaft, and then mounted in a corresponding cylindrical hole in curved section 32. For example, a rack tooth 35 has its own shaft, and can be mounted in a cylindrical hole 36 of curved section 32. The cylindrical holes in curved section 32 are laid out in some whole number of teeth spacing (based on the gear pitch being used) for the desired radius of travel for pinion 34.

After coming into contact with each individually mounted tooth, such as rack tooth 35, in curved section 32, pinion 34 causes each rack tooth in curved section 32 to rotate slightly and conform to the pinion. Otherwise, no other independent rotating action is required to rotate the rack teeth in curved section 32.

With the arrangement of rack and pinion 30, pinion 34 is able to travel in the x direction along straight section 31, then makes a turn by following a curvature r in curved section 32, and proceeds to travel in the y direction along straight section 33 in one continuous motion without any stop. Although the mechanism for moving pinion 34 along the above-mentioned path is not explicitly shown in FIG. 3, such mechanism are well-known to those skilled in the art.

Figure 4:
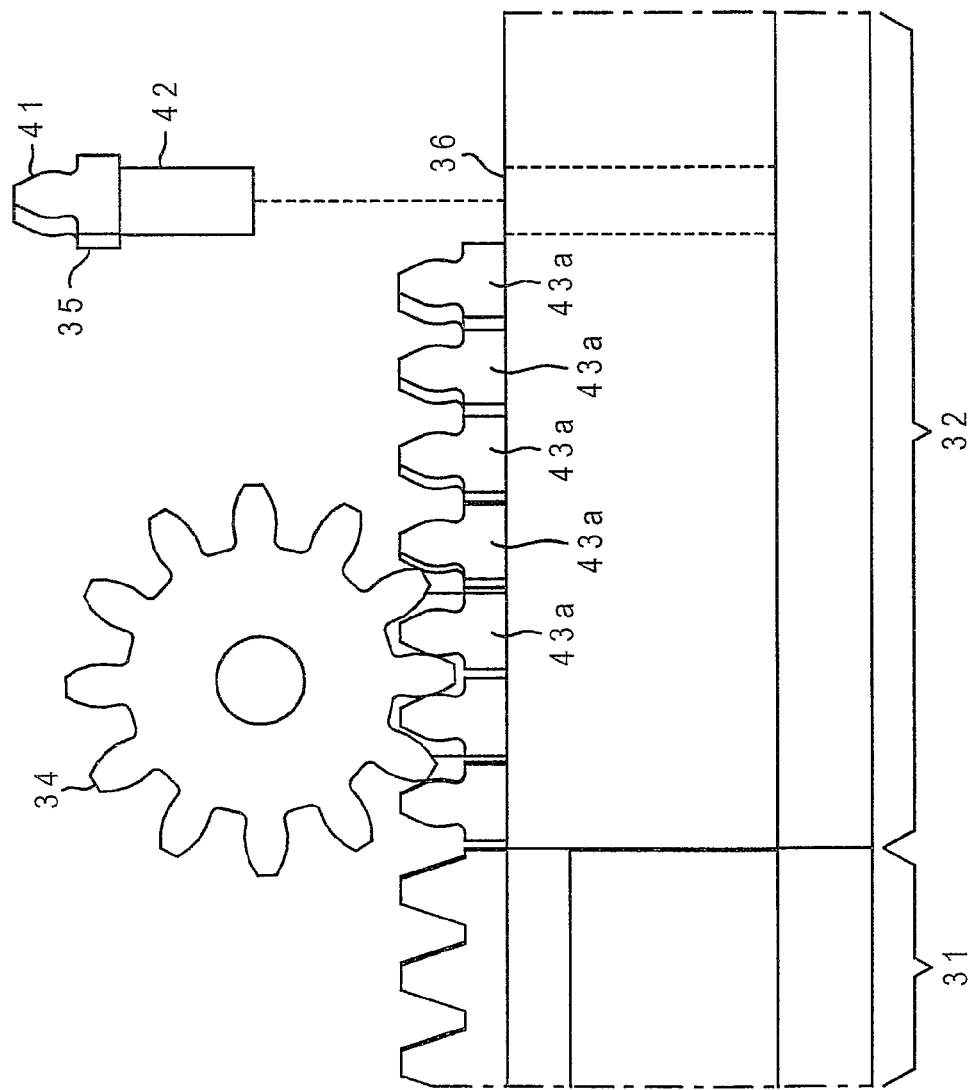
FIG. 4 is a side view of the rack and pinion assembly from FIG. 3, in accordance with a preferred embodiment of the present invention.

With reference now to FIG. 4, there is depicted a side view of rack and pinion assembly 30, in accordance with a preferred embodiment of the present invention. As shown, straight section 31 includes rack teeth that are aligned parallel to each other. Rack teeth in straight section 31 can be formed on a strip that are well-known to those skilled in the art. Curved section 32 includes rack teeth that can be rotated independently from each other. In the present example, each of rack teeth 43a-43e in curved section 32 is turned slightly to face a rotation axis 37 from FIG. 3. Pinion 34 is a conventional pinion having regular pinion teeth that are well-known to those skilled in the art.

Preferably, each rack tooth in curved section 32 can be removed from its corresponding cylindrical hole. For example, rack tooth 35 is shown to be removed from its cylindrical hole 36. Rack tooth 35 includes a head 41 and a cylindrical shaft 42. Cylindrical shaft 42 allows rack tooth 35 to rotate freely within cylindrical hole 36.

As has been described, the present invention provides a data storage library having a robotic assembly that uses a rack and pinion arrangement. The rack of the rack and pinion arrangement has linear and curved sections. Because the rack teeth in the curved section of the rack can be rotated to conform locally to the pinion teeth, they need not be tapered in order for the pinion to travel along the curved section of the rack. Also, there is no need for the pinion to be tapered to conform to the curved section of the rack either.

While the invention has been particularly shown and described with reference to a preferred embodiment, it will be understood by those skilled in the art that various changes in form and detail may be made therein without departing from the spirit and scope of the invention.

What is claimed is:

1. A method for transporting a storage media cartridge within a storage media library, said method comprising:
    utilizing an accessor for carrying said storage media cartridge;
    providing a rack having a straight section and a curved section within said storage media library, wherein said curved section includes a plurality of rack teeth that are capable of rotating independently from each other; and
    driving said accessor via a pinion, wherein said pinion is capable of traveling along said straight section and said curved section of said rack.

2. The method of claim 1, wherein one of said plurality of rack teeth includes a head and a cylindrical shaft.

3. The method of claim 1, wherein said curved rack includes a plurality of cylindrical holes for receiving said plurality of rack teeth.

4. The method claim 1, wherein said pinion causes each of said plurality of rack teeth in said curved section to rotate slightly to conform with said pinion.

* * * * *